(12) United States Patent
Nishiyama

(10) Patent No.: US 6,210,167 B1
(45) Date of Patent: *Apr. 3, 2001

(54) RIDING GAMING MACHINE

(75) Inventor: Takashi Nishiyama, Osaka (JP)

(73) Assignee: SNK Corporation (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/090,822

(22) Filed: Jun. 4, 1998

(51) Int. Cl.⁷ ............................................. A63B 69/00
(52) U.S. Cl. ........................ 434/247; 446/29; 472/95
(58) Field of Search ..................... 434/247, 66, 29, 434/62; 472/95, 135, 59, 60; 446/29

(56) References Cited

U.S. PATENT DOCUMENTS

| 3,672,075 | * | 6/1972 | Eikelenboom | 434/247 |
| 4,713,010 | * | 12/1987 | Veillas | 434/247 |
| 4,957,444 | * | 9/1990 | Armen | 434/247 |
| 4,988,300 | * | 12/1989 | Yamaguchi | 434/247 |
| 5,429,515 | * | 7/1995 | Greenwood | 434/247 |
| 5,865,624 | * | 11/1995 | Hayashigawa | 434/66 |
| 5,910,046 | * | 6/1999 | Wada | 463/6 |

FOREIGN PATENT DOCUMENTS

| 2233913 | 2/1994 | (GB) . |
| 2-118582 | 9/1990 | (JP) . |
| 8-173628 | 7/1996 | (JP) . |
| 8-336671 | 12/1996 | (JP) . |
| 1301420 | * 4/1987 | (SU) ..................... 434/247 |

* cited by examiner

Primary Examiner—Jacob K. Ackun
Assistant Examiner—Kit Fernstrom
(74) Attorney, Agent, or Firm—Sheppard, Mullin, Richter & Hampton LLP

(57) ABSTRACT

A riding gaming machine has display means for displaying game information and a riding horse body imitating a horse body. The riding horse body is provided with manipulation means for performing game manipulation and a control section being connected to the display means and the manipulation means for controlling game information displayed on the display means.

10 Claims, 8 Drawing Sheets

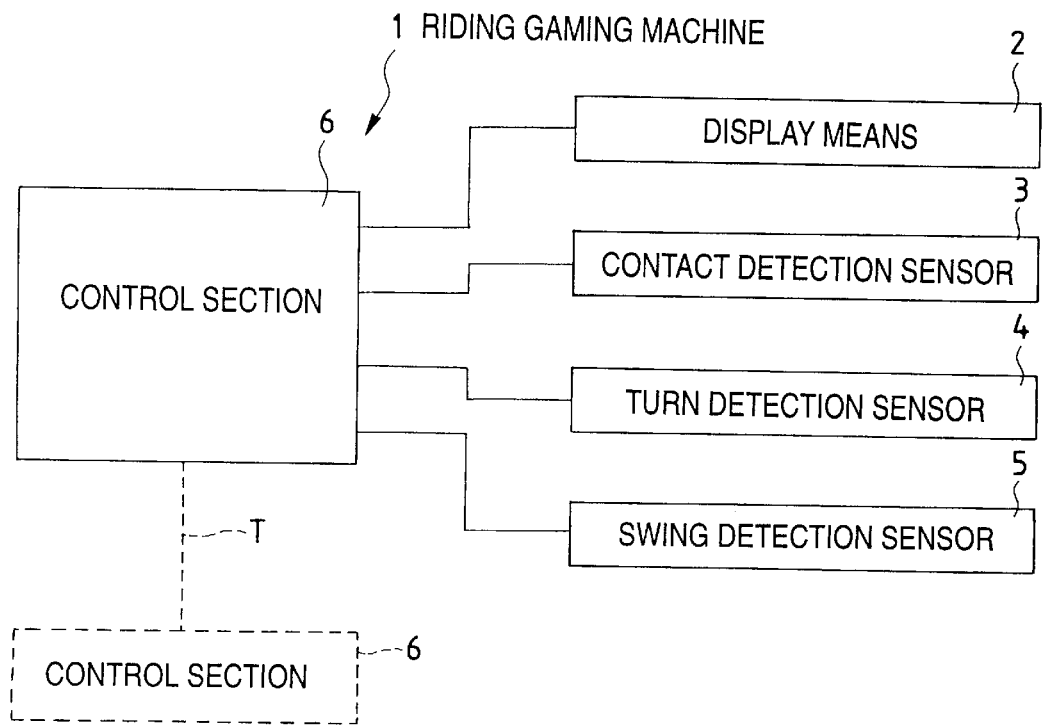
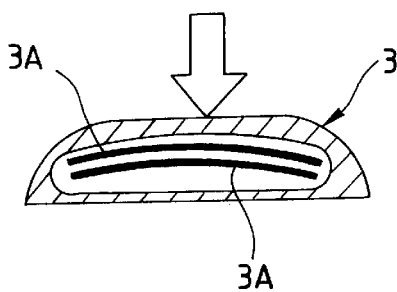

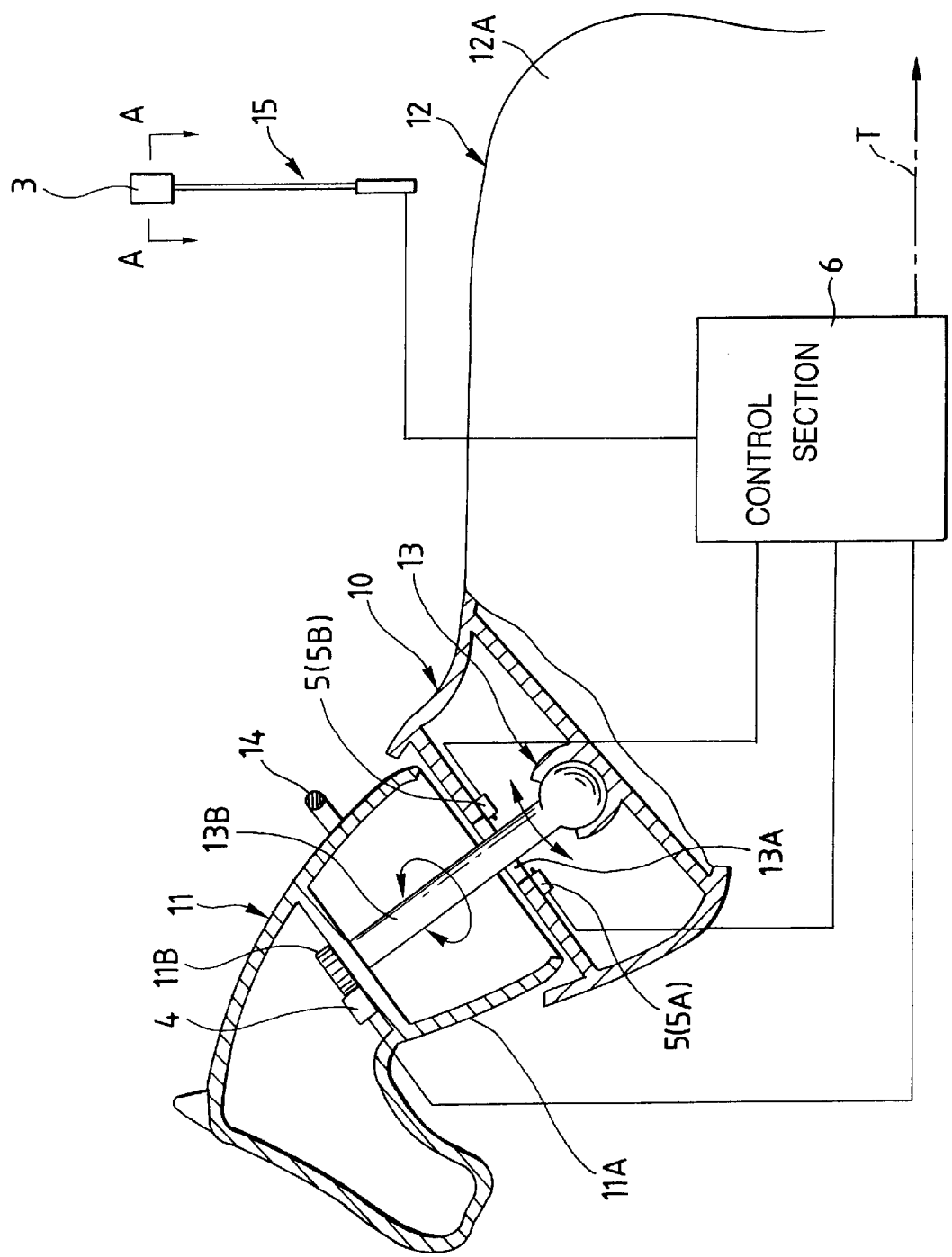

RIDING GAMING MACHINE

BACKGROUND OF THE INVENTION

This invention relates to a riding gaming machine for a game player to experience horse riding while enjoying a landscape represented in a monitor, compete with another horse displayed in the monitor in racing, etc.

A conventional riding gaming machine exists as an amusement machine intended for children as known as a merry-go-round from long ago.

Most conventional riding gaming machines are intended for children; not only children, but also adults can enjoy some riding gaming machines for a game player to ride an unruly horse and compete with other players for the riding time (so called rodeo), but the riding gaming frame is poor in reality and only the saddle part is reproduced, for example, as disclosed in the Unexamined Japanese Utility Model Application Publication No. Hei 2-118582.

With the riding gaming machine described here, a riding horse body imitating a horse saddle part placed on a rotary table is disposed rotatably on a main shaft and when a game player rides the riding horse body, the main shaft rotates and the rotary table moves up and down accordingly, whereby the riding horse body makes motion like a saddle put on an unruly horse.

As another related art, a simulation system is proposed wherein the riding horse body is made to take motion like an actual horse and whether the way the game player holds the reins is good or bad is determined.

However, in the conventional riding game, once a game player rides the riding gaming machine and the game starts, the riding gaming machine takes the initiative in advancing the game. Therefore, once the game starts, the game player cannot handle the riding gaming machine.

In actual horse riding, however, the horse rider handles reins, whips his or her horse, etc., to change the horse movement direction or speed up the horse; a riding gaming machine rich in reality which allows the game player to take the initiative in handling reins, whipping his or her horse, etc., does not exist at present.

Conventional riding gaming machines are machines for the game player to ride the riding horse body and feel as if he or she experienced horse riding or training machines for the player to well ride; they are uninteresting, and more real and elaborate riding gaming machines are demanded.

SUMMARY OF THE INVENTION

It is therefore an object of the invention to provide a riding gaming machine rich in reality that can simulate game information on display means in response to a game player handling the riding gaming machine.

To the end, the invention adopts the following configurations:

According to the invention of aspect 1, there is provided a riding gaming machine comprising display means for displaying game information and a riding horse body imitating a horse body, characterized in that the riding horse body comprises manipulation means for performing game manipulation and a control section being connected to a display screen and the manipulation means for controlling the game information.

According to the invention of aspect 2, in the invention of aspect 1, a whip connected to the control section is used as the manipulation means and a contact detection sensor is installed in the contact part of the whip with the riding horse body.

According to the invention of aspect 3, in the invention of aspect 1, a contact detection sensor connected to the control section is installed in buttocks of the riding horse body as the manipulation means for detecting a game player whipping the buttocks.

According to the invention of aspect 4, in the invention of aspect 1, a grip that a game player can hold is installed on the riding horse body as the manipulation means and a turn detection sensor detects the game player holding the grip and turning the head of the riding horse body.

The turn detection sensor may detect the head of the horse body being turned or detect a stress to turn the head being applied although in fact the head does not turn.

According to the invention of aspect 5, in the invention of aspect 1, a grip that a game player can hold is installed on the riding horse body as the manipulation means and a swing detection sensor detects the game player holding the grip and swinging the head of the riding horse body back and forth.

The swing detection sensor may detect the head of the horse body being swung or detect a stress to swing the head being applied although in fact the head does not swing.

According to the invention of aspect 6, in the invention of aspect 1, the control section is provided with communication means being connected to communication means of another riding gaming machine.

According to the invention of aspect 7, there is provided a riding gaming machine comprising display means for displaying game information, a riding horse body imitating a horse body, and a control section being connected to the display means for controlling game information displayed on the display means, characterized by a swing detection sensor for sensing that the riding horse body swings, wherein the swing detection sensor detects the riding horse body swinging and the gaming machine simulates speeding up of the horse handled by a game player, displayed on the display means.

According to the invention of aspect 8, in the invention of aspect 7, wherein the swing detection sensor is a sensor that can detect the riding horse body swinging quantitatively and the gaming machine simulates in response to a swing quantity detected by the sensor.

According to the invention of aspect 9, in the invention of aspect 7, wherein the riding horse body is provided with a grip that a game player can hold for swinging the riding horse body and a head of the riding horse body can be turned, further including a turn detection sensor for detecting the game player holding the grip and turning the head, whereby the horse handled by the game player in the display means can be diverted based on a detection result of the turn detection sensor.

According to the invention of aspect 10, there is provided a riding gaming simulation machine comprising display means 50 for displaying information of riding game; control section 51 for controlling riding game; and manipulation means for performing game information.

According to the invention of aspect 11, in the invention of aspect 10, wherein the manipulation means comprises a rein 14B and buttons 52 for whipping.

According to the invention of aspect 1, the game player handles the manipulation means installed on the riding horse body while seeing the display means displaying game information, whereby the control section connected to the manipulation means displays game information on the display screen in response to handling of the manipulation means, enabling the game player to enjoy the game while the game player is involved in the game progress in the riding gaming machine unlike the conventional game in which the gaming machine takes the initiative.

As the display means for displaying the game information, for example, the control section is provided with ROM storing a game program and graphics information required for game progress and the state of a game proceeding in accordance with the game program is displayed on a CRT, etc., based on the graphics information read from the ROM. Alternatively, as described in the Unexamined Japanese Patent Application Publication Nos. Hei 8-173628 and 8-336671, the display means displays a miniature horse handled by the game player on a miniature race track as the miniature horse moves in association with the game player handling the miniature horse.

In the invention of aspect 2 or 3, the detection sensor detects the game player whipping the riding horse body. Thus, an exciting riding gaming machine close to actual riding can be provided which enables the game player to ride the riding horse body and speed up the horse in response to the number of times the player whips the buttocks of the horse body and the quickness and strength of whipping.

In the invention of aspect 4, the grip that the game player can hold is installed on the head of the riding horse body as the manipulation means and the turn detection sensor detects the game player holding the grip and turning the head of the riding horse body. Thus, the game player can handle the horse in the display means as he or she handles an actual riding horse by swinging the nose (head) of the horse body left or right for diverting the horse.

In the invention of aspect 5, the grip that the game player can hold is installed on the head of the riding horse body as the manipulation means and the swing detection sensor detects the game player holding the grip and swinging the head back and forth. Thus, the game player can handle the riding horse body close to an actual riding horse by pulling the grip toward the player for lifting up the horse head to slowing down the speed of the horse on the display means and pushing the grip forward for lowering the horse head to speed up the horse.

In the invention of aspect 6, the control section is provided with communication means being connected to communication means of another riding gaming machine, whereby another horse body can be made to appear in the display means so that the game player can enjoy a horse race with another game player.

BRIEF DESCRIPTION OF THE DRAWINGS

In the accompanying drawings:

FIG. 1 is a general block diagram of a riding gaming machine of one embodiment of the invention;

FIG. 2 is a partially sectional view of the riding gaming machine of the embodiment of the invention;

FIG. 3 is a sectional view taken on line A—A in FIG. 2;

DETAILED DESCRIPTION OF THE PREFERRED EMBODIMENTS

Figure 4:
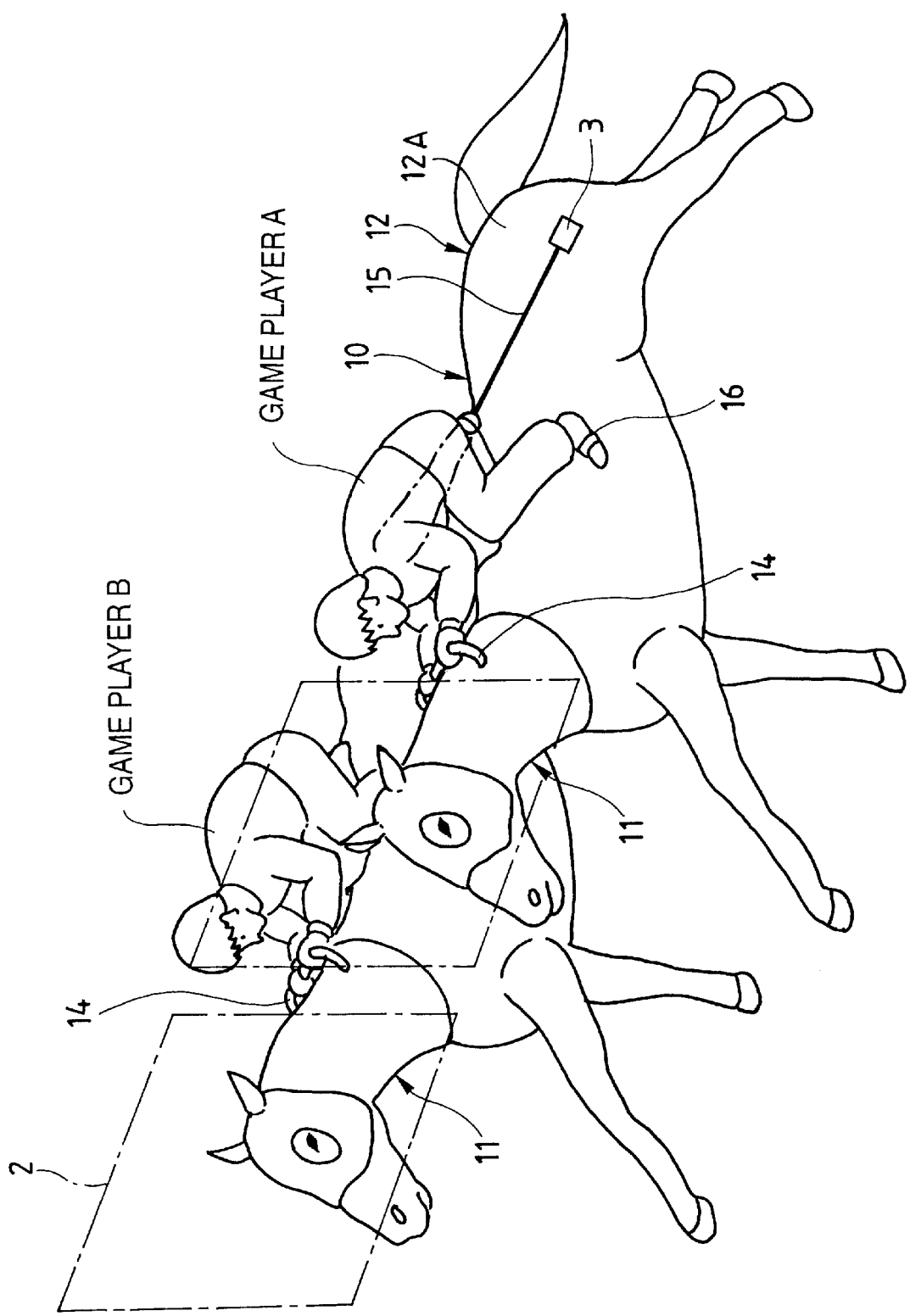
FIG. 4 is a perspective view of riding gaming machines connected to each other through communication means.

Referring now to the accompanying drawings, there are shown preferred embodiments of the invention. First, one embodiment of the invention will be discussed based on FIG. 1 to FIG. 3. FIG. 1 is a general control block diagram of a riding gaming machine of the embodiment.

In FIG. 1, numeral 1 is a riding gaming machine which comprises display means 2 for displaying game information, a contact detection sensor 3 for detecting contact between buttocks 12A of a riding horse body 12 and a whip 15 (described later), turn detection sensor 4 for detecting a turn of a neck of the riding horse body, and swing detection sensors 5 for detecting swing of the neck, the members 2 to 5 being connected to a control section 6. Any can be adopted as the display means 2 if it can display an image, such as not only a CRT, but also liquid crystal display means or a plasma display.

FIG. 2 is a schematic representation of the riding gaming machine 1 of the embodiment. Parts identical with those previously described with reference to FIG. 1 are denoted by the same reference numerals in FIG. 2.

Numeral 10 is a riding horse body imitating a horse body. The riding horse body 10 consists of a head 11 and a body 12. It is buttocks 12A that are positioned at the rear of the body 12.

The head 11 is attached to the body 12 turnably and swingably back and forth via a universal joint 13. Numeral 13A is a long hole for regulating a move of the head 11 from side to side and allowing the head 11 to move back and forth.

Numeral 14 is a grip molded integrally with a neck 11A of the head 11. When the game player holds the grip 14 and turns the head 11, the turn detection sensor 4 detects the turn. The diversion degree of the horse handled by the game player from side to side can be simulated delicately in the display means 2 in such a manner that the turn detection sensor 4 counts the number of teeth of a pinion 11B fixed integrally with the head 11 for detecting the turn degree.

A pair of swing detection sensors 5 is disposed at both margins of the long hole 13A in the length direction thereof. If the game player holds the grip 14 and pulls the head 11 backward, the swing detection sensor 5 (5A) detects a shaft 13B of the universal joint 13 coming in contact with the swing detection sensor 5 (5A) and sends a detection signal to the control section 6. When the detection signal is input to the control section 6, the machine simulates a brake effect produced for the horse handled by the game player displayed on the display means 2. If the game player holds the grip 14 and pushes the neck 11A down forward, the swing detection sensor 5 (5B) detects the shaft 13B of the universal joint 13 coming in contact with the swing detection sensor 5 (5B) and sends a detection signal to the control section 6. When the detection signal is input to the control section 6, the machine simulates a speed-up (acceleration) effect produced for the horse handled by the game player displayed on the display means 2. The embodiment adopts generally used proximity switches as the swing detection sensors 5, but sensors that can detect swing quantitatively may be adopted. By adopting the sensors that can detect swing quantitatively, the brake effect and the acceleration effect described above can be simulated in response to the swing quantity and a riding game which enables more real horse riding simulation can be provided. When the swing detection sensor 5 senses rapid swing or swing of given magnitude or more, if it is determined accordingly that the player's horse comes in contact with another horse or the game player falls off his or her horse, and the game player corrects the horse or recovers, the game is over. It is advisable to preset the machine so that if the acceleration effect is continued for a long period, the physical strength of the player's horse is exhausted as if the fuel consumption of a car increased. It is advisable to display the physical strength of the horse as a level meter on the display screen 2 so that the game player recognizes the physical strength information of the horse at the current stage. The display screen 2 is also provided with an indicator for displaying the mental condition of the horse to enable the game player to adjust the horse speed.

Numeral 15 is a whip. The contact detection sensor 3 is disposed at the contact part of the tip of the whip 15 with the riding horse body 12 and is connected to the control section 6. FIG. 3 is a sectional view taken on line A—A in FIG. 2.

As seen in FIG. 3, if pressure is applied to the contact detection sensor 3 as indicated by the arrow, two electrodes 3A and 3A come in contact with each other and whipping is detected.

FIG. 4 is a perspective view to show a form of riding gaming machines wherein one riding gaming machine is connected to the control section 6 of another riding gaming machine through communication means T so that a number of game players can enjoy a horse race. Each of game players A and B can see the display means 2, thereby visually checking whether his or her horse runs ahead of or behind the horse of another game player.

Numeral 16 is a stirrup. The stirrups 16 are provided for the game player to fix the left and right feet. The stirrup 16 is provided with a sensor or a sensor is disposed in the belly of the body 10 surrounding the stirrup and the game player can kick the belly of the body 10, thereby speeding up the horse like the above-described whipping.

The communication means T may be cable or radio means; it may be any such as means enabling two-way communication of information of frames handled by game players as a known communication-type driving game or means for collecting information of frames handled by game players in a central control section and displaying on their respective display means 2.

Figure 5:
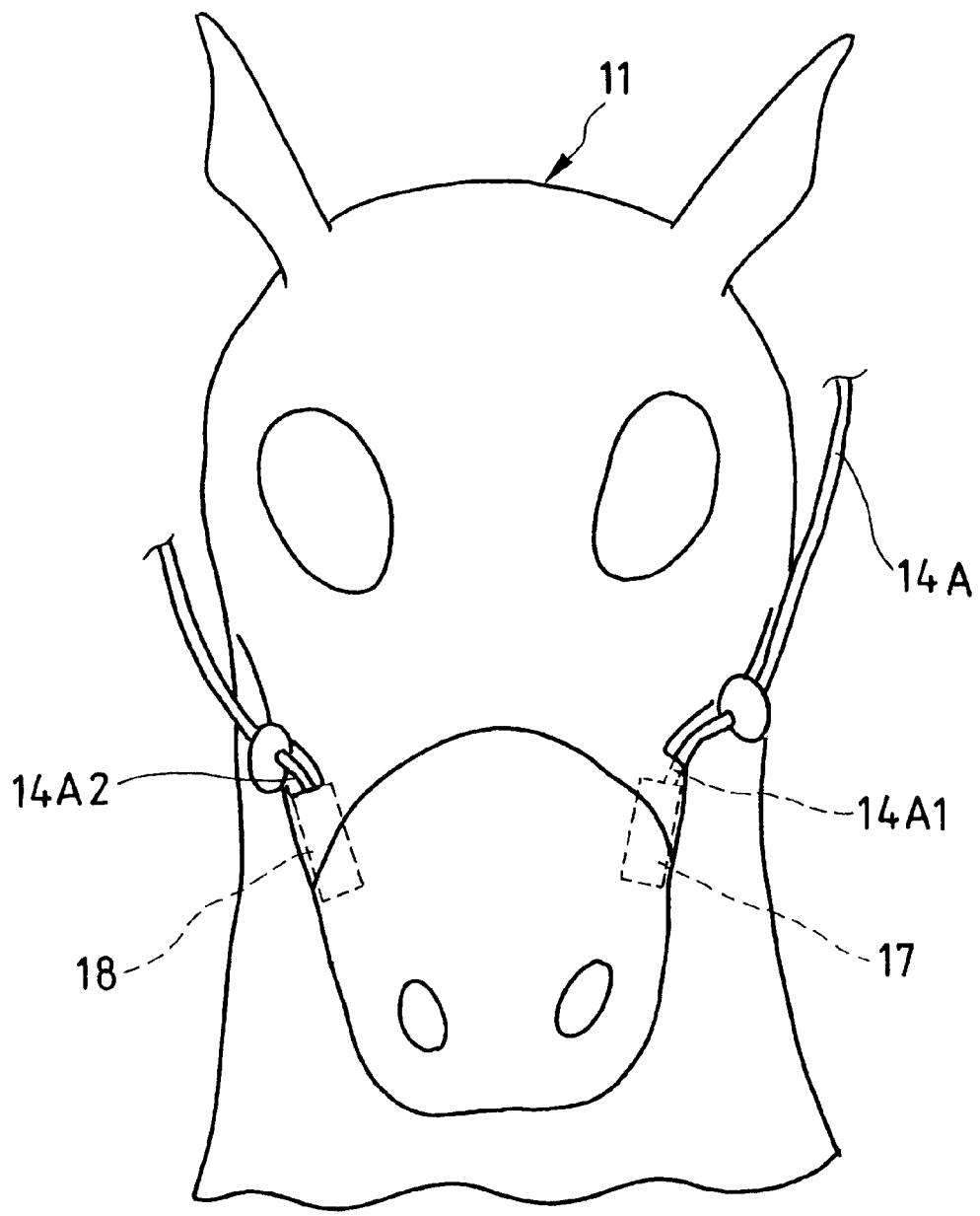
FIG. 5 is a front view of a head 11 of a riding gaming machine to show another embodiment of the invention.
Figure 6:
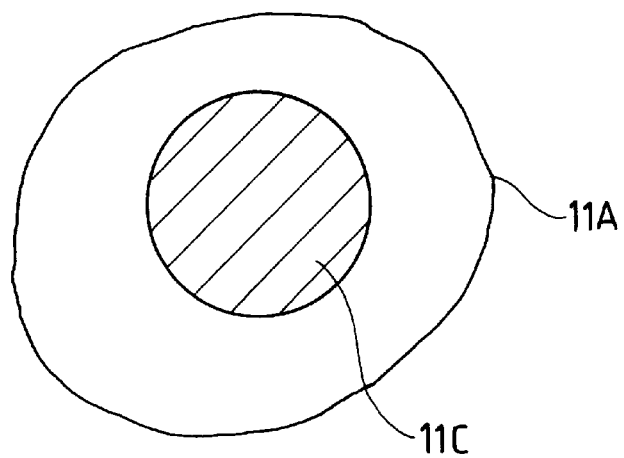
FIG. 6 is a sectional view of a neck 11A in FIG. 5.

FIG. 5 and FIG. 6 show another embodiment. In the embodiment, a head 11 can be moved in all directions with a rubber center shaft 11C as an axis in place of the complicated move structure of the head 11 of the body 10 as shown in FIG. 2, the grip 14 integral with the neck 11A is changed to reins 14A, and a pair of sensors 17 and 18 for detecting pulling of the reins 14A is connected to both ends 14A1 and 14A2 of the reins 14A. FIG. 6 is a sectional view of a neck 11A.

The sensors 17 and 18 play the same roles as the turn detection sensor 4 and the swing detection sensor 5 in the preceding embodiment. If the machine is configured in simulation so that when the game player pulls the reins 14A to pull the head 11 backward, switches of both the sensors 17 and 18 are turned on and braking is applied to the horse, the sensors 17 and 18 serve the same function as the swing detection sensor 5. When the game player pulls the one end 14A2 of the rein 14A to turn the head 11 to the right, the switch of only the sensor 18 is turned on and the horse simulated in display means 2 is changed to the right direction; the same sensor function as the turn detection sensor 4 is served. That is, the sensors 17 and 18 enable simulation so that when the game player holds the reins 14 and pulls either of the reins 14, the horse is diverted to the left or right and that when the game player pulls both the reins at a stroke, braking is applied to the horse. Therefore, the sensors 17 and 18 are equivalent in a pair to both the turn detection sensor 4 and the swing detection sensor 5.

Figure 7:
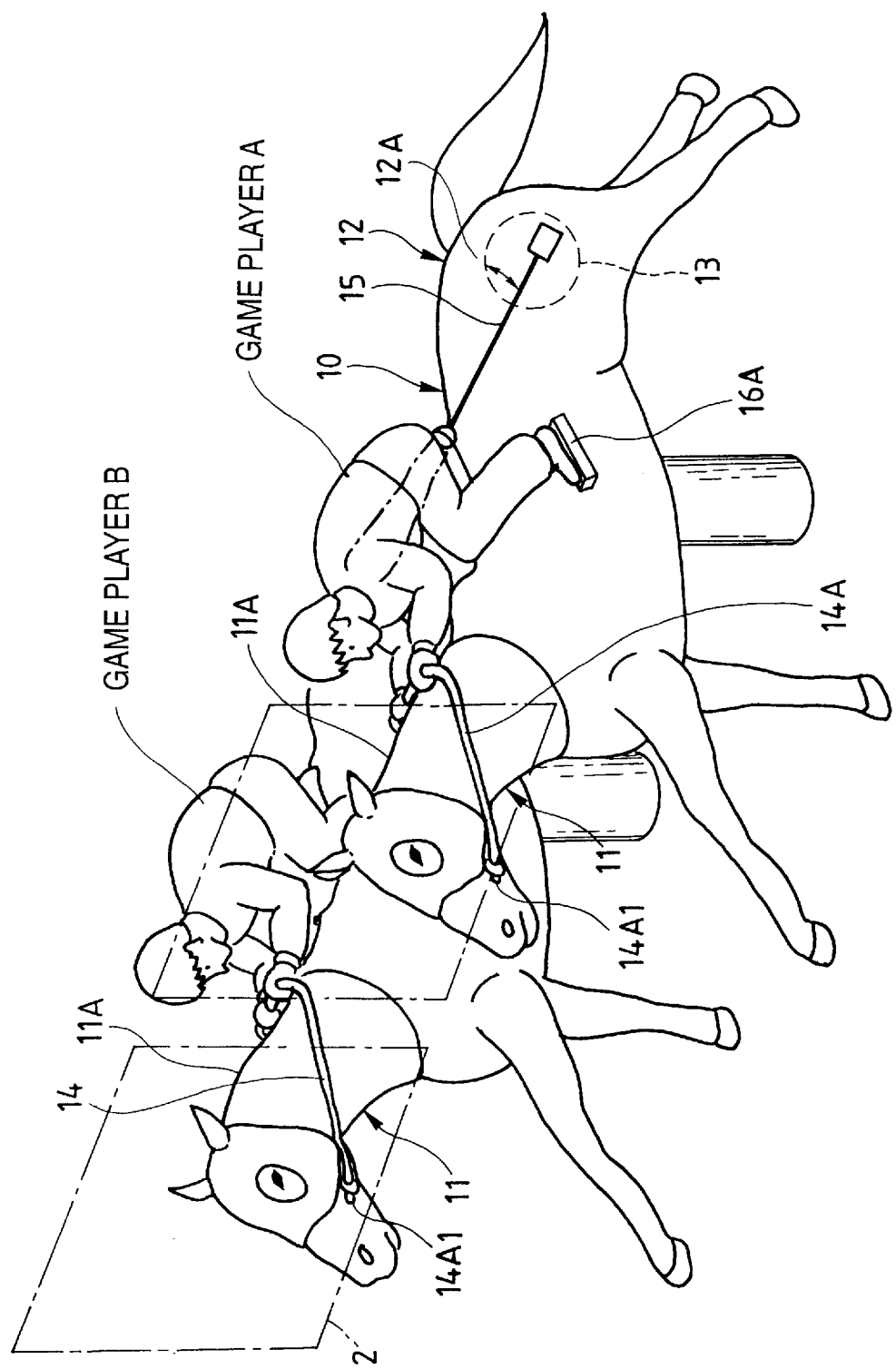
FIG. 7 is a perspective view of riding gaming machines connected to each other through communication means.

FIG. 7 shows a modified embodiment of the form in FIG. 4 wherein one riding gaming machine is connected to the control section 6 of another riding gaming machine through communication means T. In the modified embodiment, a contact detection sensor 3 is embedded in buttocks 12A (circled by the dotted line) of a body 10 rather than installed in the whip 15 shown above, and a step 16A is installed in the belly of the horse in place of the stirrup 16.

Figure 8:
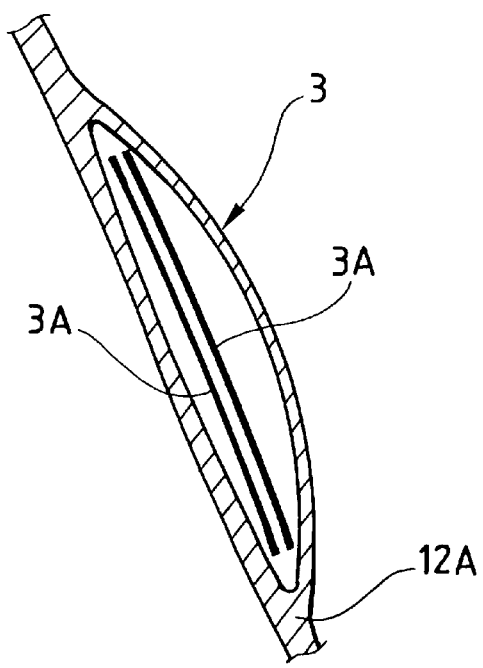
FIG. 8 is a sectional view of a contact detection sensor embedded in the buttocks of a riding gaming machine of a modified embodiment.

FIG. 8 is a fragmentary sectional view of the contact detection sensor 3 embedded in the buttocks 12A. The contact detection sensor 3 has a similar configuration to that of the contact detection sensor 3 shown in FIG. 3; parts similar to those previously described with reference to FIG. 3 are denoted by the same reference numerals in FIG. 8.

In addition to the game player inputting a coin and playing a game actually, display means and sound means can also be used to demonstrate the game to appeal to a large number of people.

By the way, an amusement machine for a game player to experience horse riding may be a machine for a game player to actually swing the riding horse body or turn the head thereof, thereby running the riding horse character displayed on display means, as described above. In addition, a riding gaming machine wherein the riding horse body that a game player rises runs actually can also be designed.

Figure 9:
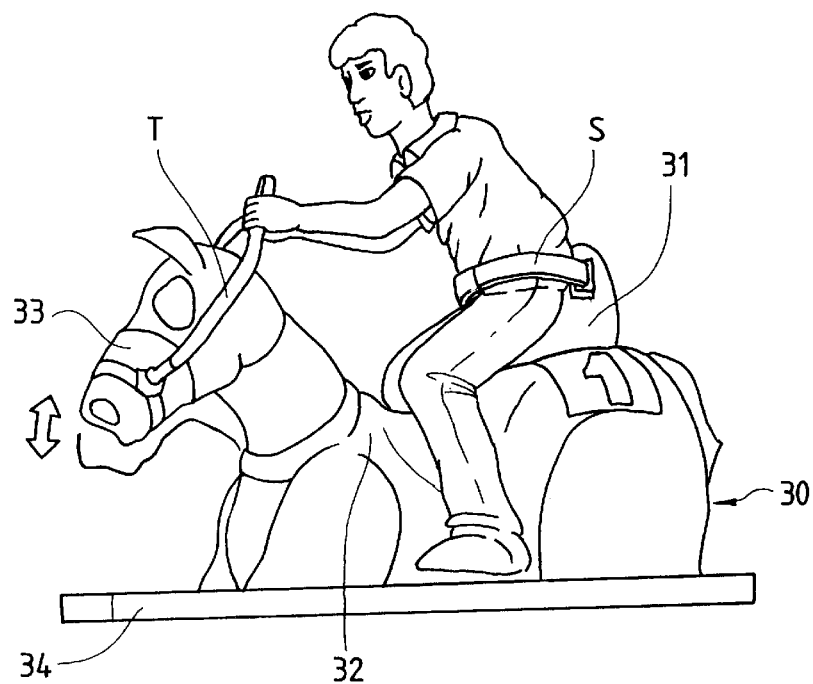
FIG. 9 to FIG. 11 are illustrations to describe one embodiment of a riding gaming machine wherein the riding horse body that a game player rises runs actually.
Figure 11:
Figure 10:
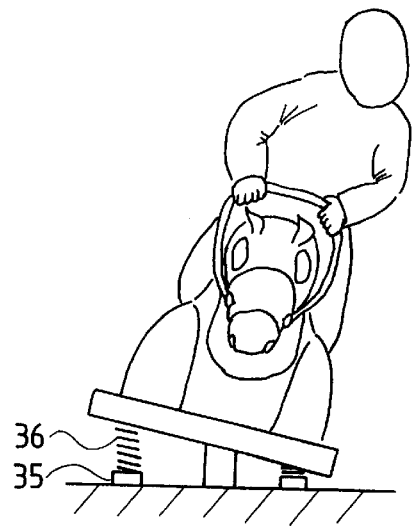

FIG. 9 to FIG. 11 are illustrations to describe one embodiment.

Numeral 30 is a riding horse body comprising a seat section 31 taken by a game player, a fixed body section 32, and a head 33 swung manually by the game player. The head 33 is provided with a rein T used by the game player. A seat belt S for fixing the game player is attached to the seat section 31, so that the game player easily pulls the rein T. The riding horse body 30 is fixed on a base 34 on which the game player puts his feet. A plurality of wheels 35 for advancing the riding horse body 30 are mounted on the lower face of the base 34 and are rotated at predetermined speed by drive of a motor (not shown). When the game player swings the head 33, the motor starts to turn; when the game player stops swinging the head 33, the motor stops turning. A swing mechanism of the head 33 is almost the same as that described in the preceding embodiment; a swing detection sensor contained in the riding horse body 30 detects the head swinging and transmits it to the motor. The travel direction of the riding horse body 30 basically is straight, but can be changed to the direction in which the game player moves his or her weight, as shown in FIG. 10. Specifically, a plurality of compression springs 36 are mounted on the lower face of the base 34 and when the game player moves his or her weight, the compression spring 36 on the side to which the game player moves his or her weight is compressed, the riding horse body 30 is inclined, and the forces exerted on the wheels 35 get out of balance, causing the riding horse body 30 to advance like a curve in the weight move direction. The wheels 35 turn in the direction of turning the head 33 and the riding horse body 30 changes the travel direction to that direction. A foot switch (not shown) is housed in buttocks of the riding horse body 30. As shown in FIG. 11, if the game player uses a whip 37 to beat the foot switch for actuating the foot switch, the number of revolutions of the motor rises for a given time and the advance speed of the riding horse body 30 increases. The foot switch may be any if it detects the game player whipping, such as a pressure sensor. A string imitating a whip may be pulled instead of whipping, in which case it can be detected almost as in the preceding embodiment. The game machine may include a swing detection sensor for sensing the swinging of the riding horse body. The riding game machine simulates a speeding up of the horse handled by a game player in response to the swinging of the riding horse body, which is displayed on the display.

Thus, the game player handles the gaming machine for actually advancing the riding horse body, whereby he or she can experience artificial horse riding close to real horse riding, not provided by the gaming machine for the game player only to swing the riding horse body and turn the head before the display means as described in the preceding embodiment. Particularly, in recent years, amusement machines such as a gaming machine enabling the game player to gain more real experience have been demanded.

Further, the riding horse body 30 contains a loudspeaker (not shown) and a horse cry and a footstep previously stored can also be produced through the loudspeaker as the riding horse body 30 advances or is whipped or the head 33 is swung, whereby the game player can experience artificial horse riding closer to real horse riding.

Figure 12:
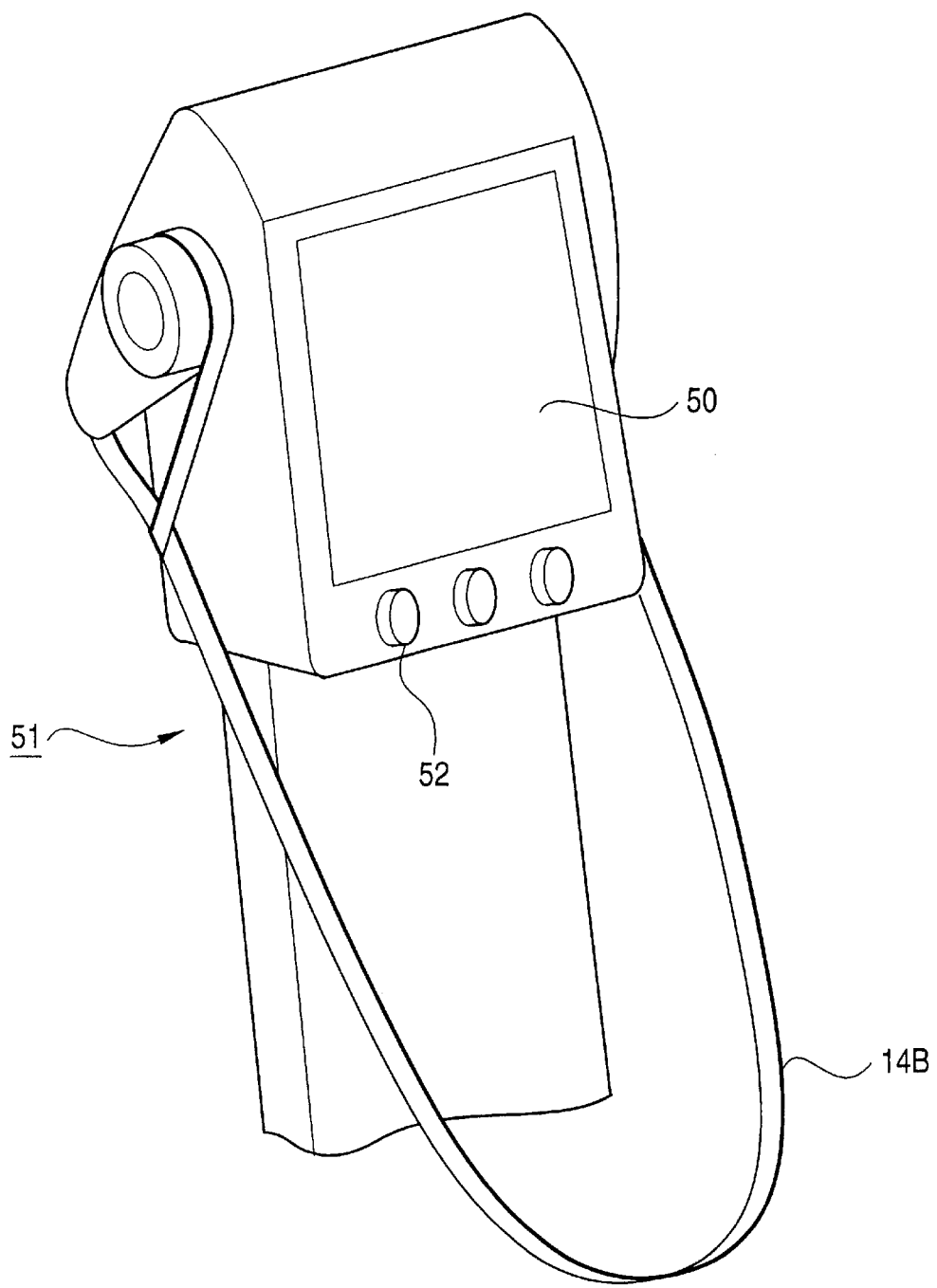
FIG. 12 is an illustration to describe one embodiment of a riding gaming simulation machine.

As shown in FIG. 12, the riding gaming machine of the present invention is not limited to be a machine on which a game player rides, and may be a machine which a game player plays by hand. The game machine may include a display 50 for displaying riding game information, a control section 51 for controlling the riding game, and manipulation means for inputting game information. The manipulation means may comprise a rein 14B and buttons 52 for whipping.

What is claimed is:
1. A riding game machine comprising:
   display means for displaying game information; and
   a riding horse body imitating a horse body, wherein said riding horse body includes,
      a whip connected to a control section for performing game manipulation;
      said control section also connected to said display means and, configured to control game information displayed on the display means, wherein the control section controls the display means to simulate a competitive horse race, the display means displaying the competitive relation of the horses in the horse race; and
      a contact detection sensor in said whip configured to detect contact with said riding horse body.
2. The riding game machine claimed in claim 1, wherein said manipulation means includes a contact detection sensor, connected to said control section, in a buttocks region of said riding horse body, said contact detection sensor being configured to detect a game player whipping said buttocks region.
3. The riding game machine claimed in claim 1, wherein said manipulation means includes a grip that a game player can hold located on a head portion of said riding horse body, said riding game machine further comprising:
   a turn detection sensor, in communication with the control section, configured to detect the game player turning the head of said riding horse body, wherein said display means depicts a running direction that the controller controls according to the turning of the head of said riding horse body.
4. The riding game machine claimed in claim 1, wherein said manipulation means includes a grip that a game player can hold located on a head portion of said riding horse body, said riding game machine further comprising:
   a swing detection sensor configured to detect the game player holding the grip and swinging the head portion of said riding horse body.
5. The riding game machine claimed in claim 1, wherein said control section is provided with communication means connected to a communication means of an adjacent riding game machine, within view of a rider on said riding horse body, said control section being configured to communicate with said adjacent riding machine so as to allow the adjacent riding machine to participate in the horse race.
6. The riding game machine claimed in claim 1, wherein the body includes a head portion and a body portion, and further comprising a swing detection sensor configured to detect displacement of the head portion with respect to the body portion.
7. The riding game machine claimed in claim 1, wherein the body includes a head portion with reins and a body portion, and further comprising a swing detection sensor configured to detect swinging of the head portion with respect to the body portion by measuring forces on the reins.
8. A riding game machine comprising:
   display means for displaying game information;
   a riding horse body, imitating a horse body, configured to swing;
   a control section connected to said display means for controlling game information displayed on said display means, wherein the control section controls the display means to simulate a competitive horse race, the display means displaying the competitive relation of the horses in the horse race; and
   a swing detection sensor for sensing said riding horse body swinging,
      wherein said swing detection sensor detects said riding horse body swinging, and said riding game machine simulates a speeding up of said horse handled by a game player in response to said riding horse body swinging, the speeding up being displayed on said display means.
9. The riding game machine claimed in claim 8, wherein said swing detection sensor is a sensor that can quantitatively detect said riding horse body swinging, and said riding game machine simulates speed in response to a swing quantity detected by said sensor.
10. The riding game machine claimed in claim 8, wherein said riding horse body includes:
   a turnable head portion; and
   a grip that a game player can hold, the grip being configured for swinging said riding horse body and turning the head portion of said riding horse body,
   said riding game machine further comprising:
      a turn detection sensor for detecting the turning of said head, such that said horse can be diverted in said display means based on a detection result of said turn detection sensor.

* * * * *